United States Patent
Yang et al.

(10) Patent No.: US 11,102,711 B2
(45) Date of Patent: Aug. 24, 2021

(54) METHODS AND APPARATUS FOR MOBILITY MANAGEMENT BETWEEN FIXED TRANSMISSION POINTS AND MOBILE TRANSMISSION POINTS

(71) Applicant: IDAC Holdings, Inc., Wilmington, DE (US)

(72) Inventors: Jiaxin Yang, Montreal (CA); Benoit Pelletier, Roxboro (CA); Paul Marinier, Brossard (CA); J. Patrick Tooher, Montreal (CA)

(73) Assignee: IDAC Holdings, Inc., Wilmington, DE (US)

(*) Notice: Subject to any disclaimer, the term of this patent is extended or adjusted under 35 U.S.C. 154(b) by 125 days.

(21) Appl. No.: 16/491,416

(22) PCT Filed: Mar. 9, 2018

(86) PCT No.: PCT/US2018/021835
§ 371 (c)(1),
(2) Date: Sep. 5, 2019

(87) PCT Pub. No.: WO2018/169796
PCT Pub. Date: Sep. 20, 2018

(65) Prior Publication Data
US 2020/0022073 A1    Jan. 16, 2020

Related U.S. Application Data

(60) Provisional application No. 62/471,720, filed on Mar. 15, 2017.

(51) Int. Cl.
*H04W 48/16* (2009.01)
*H04B 17/318* (2015.01)
(Continued)

(52) U.S. Cl.
CPC .......... *H04W 48/16* (2013.01); *H04B 17/318* (2015.01); *H04L 5/0051* (2013.01);
(Continued)

(58) Field of Classification Search
CPC .................................................. H04W 48/16
See application file for complete search history.

(56) References Cited

U.S. PATENT DOCUMENTS

2013/0059589 A1* 3/2013 Dalsgaard ......... H04W 36/0088
455/437
2014/0003327 A1    1/2014 Seo et al.
(Continued)

FOREIGN PATENT DOCUMENTS

WO    WO 2013051978 A1    4/2013
WO    WO 2013111422 A1    8/2013

OTHER PUBLICATIONS

Rose Qingyang Hu et al., Evolution of HetNet Technologies in LTE-advanced Standards, Heterogeneous Cellular Networks, Wiley, New York, pp. 288-311, Apr. 3, 2013, 24 pages.
(Continued)

*Primary Examiner* — Sulaiman Nooristany
(74) *Attorney, Agent, or Firm* — Julian F. Santos

(57) ABSTRACT

In a network comprising both fixed transmission points and mobile transmission points, the transmission points may transmit discovery reference signals that allow WTRUs to detect and/or synchronize to the transmission points. The fixed and mobile transmission points may transmit discovery reference signals with different characteristics that allow the WTRUs to distinguish between fixed and mobile transmission points. The mobile transmission points may also transmit a separate maintenance reference signal that allows WTRUs to maintain a connection with the mobile transmission point. For networks in which fixed a mobile transmis-
(Continued)

sion points operate in different frequency bands, the mobile transmission points may also periodically transmit discovery beacon signals in the frequency band of the fixed transmission points to allow discovery. Conditions may be imposed on WTRUs before the WTRU will transmit to the network a measurement report reporting on a potential transmission point to which it may be switched. Such conditions may include the speed of a WTRU relative to the transmission point with which it is currently associated, the speed of the WTRU relative to the newly discovered transmission point or both.

20 Claims, 9 Drawing Sheets

(51) Int. Cl.
*H04W 76/11* (2018.01)
*H04W 4/40* (2018.01)
*H04L 5/00* (2006.01)
*H04W 24/10* (2009.01)
*H04W 56/00* (2009.01)

(52) U.S. Cl.
CPC ............ *H04W 4/40* (2018.02); *H04W 24/10* (2013.01); *H04W 56/001* (2013.01); *H04W 76/11* (2018.02)

(56) References Cited

U.S. PATENT DOCUMENTS

| | | |
|---|---|---|
| 2015/0304925 A1 | 10/2015 | Hwang et al. |
| 2017/0026891 A1 | 1/2017 | Hahn et al. |
| 2017/0027014 A1 | 1/2017 | Chae et al. |

OTHER PUBLICATIONS

Kim et al.: "Optimal Relaying Strategy for UE Rays", 2011 17th Asia-Pacific Conference on Communications (APCC), Sabath, Malaysia, Oct. 2-5, 2011, 5 pages.
Communication pursuant to Article 94(3) EPC for EP 18 716 698.8, dated Nov. 18, 2020, 8 pages.

* cited by examiner

METHODS AND APPARATUS FOR MOBILITY MANAGEMENT BETWEEN FIXED TRANSMISSION POINTS AND MOBILE TRANSMISSION POINTS

CROSS-REFERENCE TO RELATED APPLICATIONS

This application is a 371 U.S. National Stage entry of PCT Application No. PCT/US2018/021835, filed Mar. 9, 2018, which claims the benefit of U.S. Provisional Patent Application No. 62/471,720, filed on Mar. 15, 2017, the contents of each of which are incorporated herein fully by reference.

BACKGROUND

Mobility is one of the key differentiators between mobile wireless systems (e.g., LTE) and other forms of wireless communications, such as Wireless LANs. In LTE, mobility control mechanisms are invoked to maintain the quality of on-going services of User Equipment (UE or UEs) as the latter move across cells. Fundamentally, there are two kinds of UE mobility control, namely, UE-controlled cell reselection in idle mode and network-controlled handover in connected mode. Both mobility control mechanisms are based on the measurement of the signal strength and quality of the designated cells. One difference between the two control mechanisms is that UEs in connected mode will be notified of the criteria to be used for measuring and reporting purposes via the Measurement Control messages. When any of the specified reporting criteria are met, the UE feeds the results back to the network in a Measurement Report message. On this basis, it is the network's responsibility to determine a potential handover instead of the UE performing cell reselection in idle mode.

One desirable feature for the next-generation cellular networks, e.g., 3GPP NR (New Radio), currently under discussion is the capability to support a mobile transmission point (Mbl-TRP, which is typically deployed in a moving vehicle such as a bus, a high-speed train, an airplane, etc. In this discussion, a transmission point (TRP) generally may belong to one of two different categories: mobile or fixed. A mobile TRP (Mbl-TRP) is a TRP that may be moving (for example, a TRP in a public transportation vehicle, such as a bus or train), and a fixed TRP (Fxd-TRP) is a more conventional TRP such as a base station that may be fixed to a geographical location. As used herein, an in-vehicle UE (or InVeh-UE) is an UE that is inside the vehicle where the Mbl-TRP is mounted, while a street-side UE (or StrSide-UE) is defined as an UE which is not in the vehicle (but not necessarily on the street or the side of a street).

Mbl-TRPs are primarily adapted to provide access services for InVeh-UEs while connecting to the network (e.g. external eNBs, access points or Remote Radio Heads (RRHs) via wireless backhaul links. Therefore, a Mbl-TRP can be viewed as a generalized small cell eNB with mobility functionality. On one hand, due to the mobility, it is generally beneficial for an InVeh-UEs to be connected to the Mbl-TRP instead of an external eNBs since the signal transmitted from the Mbl-TRP is normally the strongest for the InVeh-UEs and therefore good performance and service quality can be maintained. On the other hand, it can be advantageous to prevent those UEs that are not inside the vehicle, e.g., StrSide-UEs, from camping on or connecting to a mobile TRP to avoid potential "ping pong" effects in cell reselection or unnecessary handover. As a result, it is desirable to design a robust and efficient cell reselection/handover mechanism for UEs in the scenario of mobile TRPs.

SUMMARY

In a network comprising both fixed transmission points and mobile transmission points, the transmission points transmit discovery reference signals that allow WTRUs to detect and/or synchronize to the transmission points. The fixed and mobile transmission points may transmit discovery reference signals with different characteristics that allow the WTRUs to distinguish between fixed and mobile transmission points. The mobile transmission points also transmit a separate maintenance reference signal that allows WTRUs to maintain a connection with the mobile transmission point.

For networks in which fixed and mobile transmission points operate in different frequency bands, the mobile transmission points also may periodically transmit discovery beacon signals in the frequency band of the fixed transmission points to allow discovery.

Conditions may be imposed on WTRUs before the WTRU will transmit to the network a measurement report reporting on a newly discovered transmission point and/or will even perform a measurement. Such conditions may include the speed of a WTRU relative to the transmission point with which it is currently associated, the speed of the WTRU relative to the newly discovered transmission point or both.

BRIEF DESCRIPTION OF THE DRAWINGS

Furthermore, like reference numerals in the figures indicate like elements, and wherein.

EXAMPLE NETWORKS FOR IMPLEMENTATION OF THE EMBODIMENTS

Figure 1A:
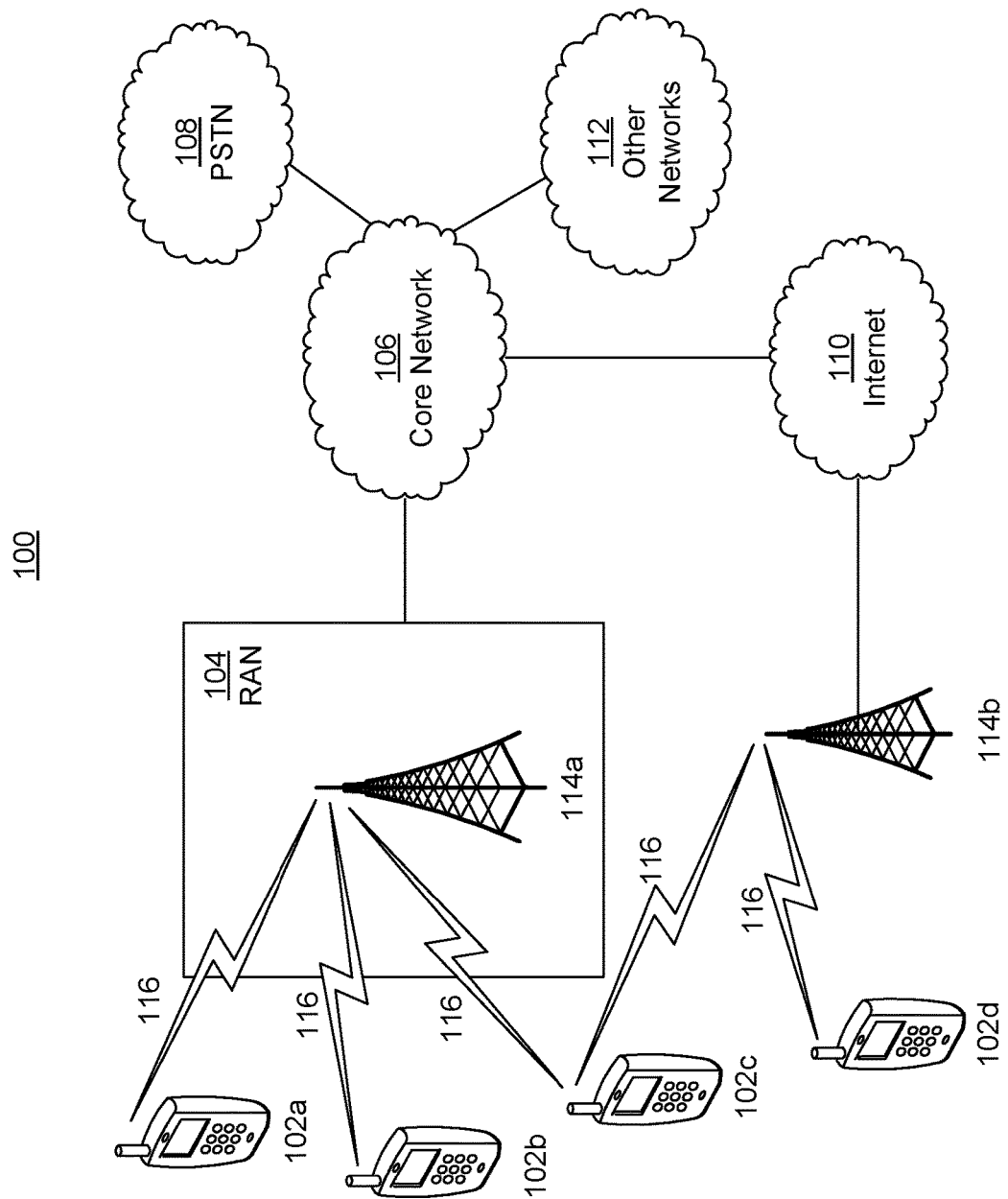
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs (also sometimes referred to herein as User Equipment or UEs), base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
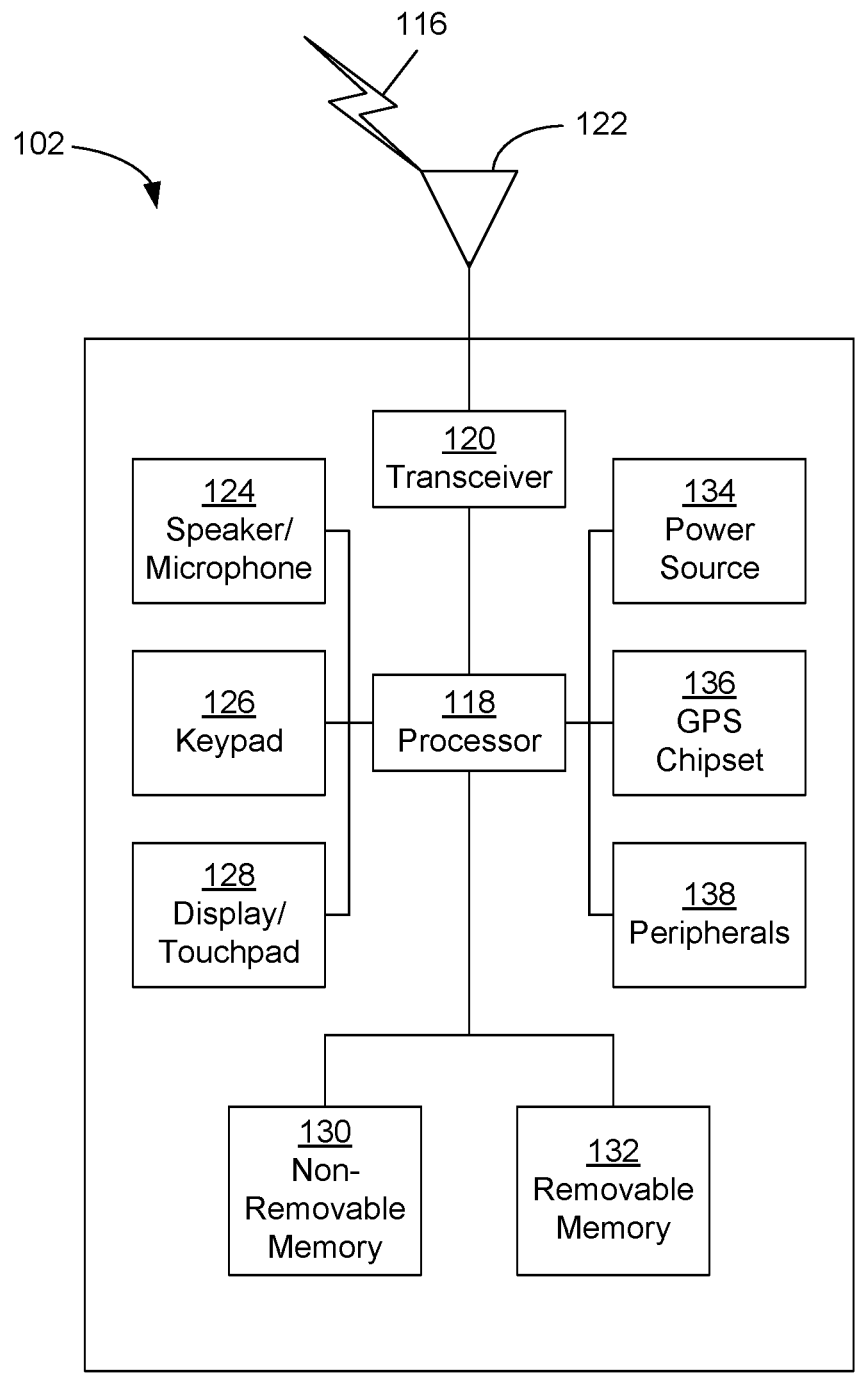
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
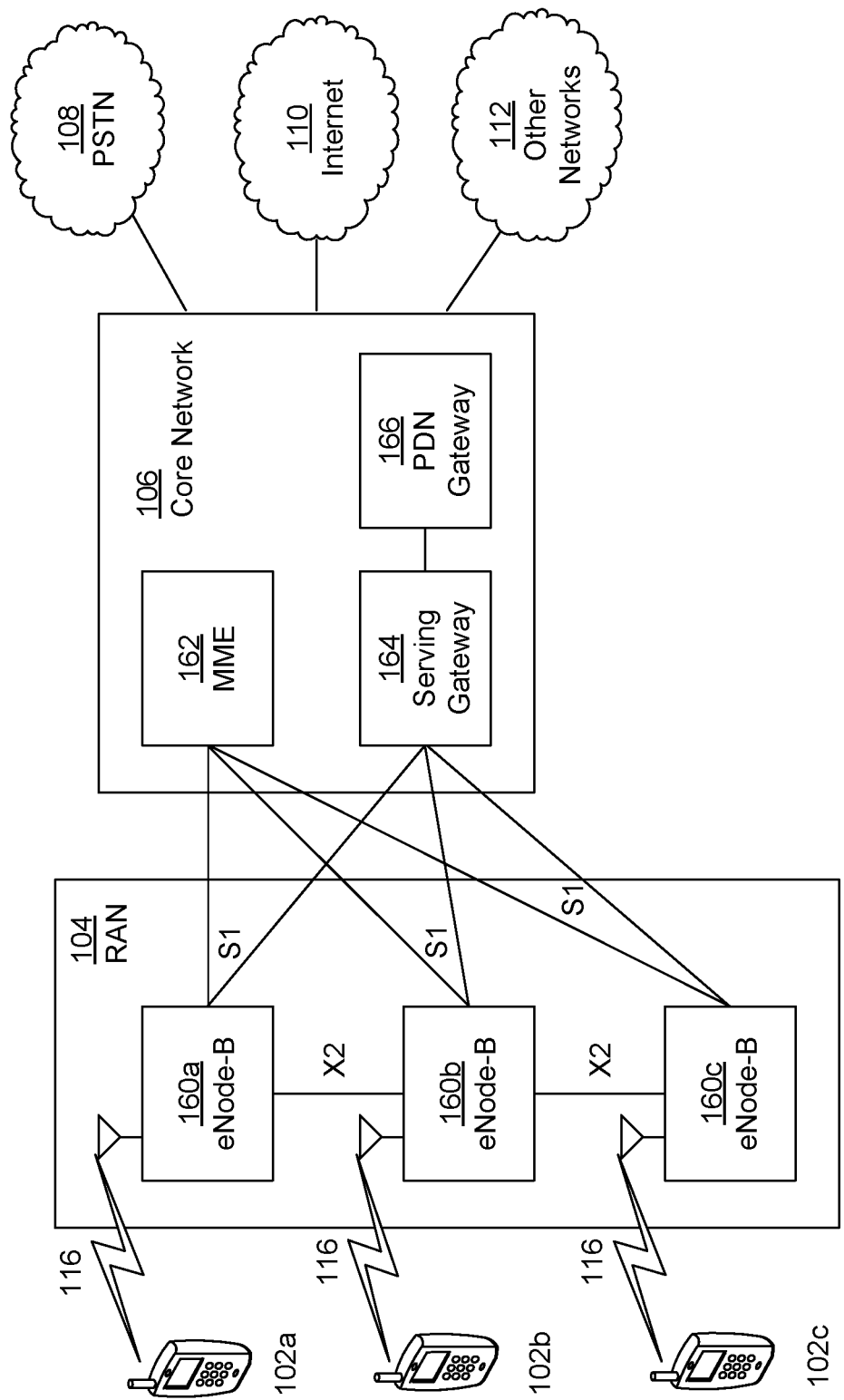
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
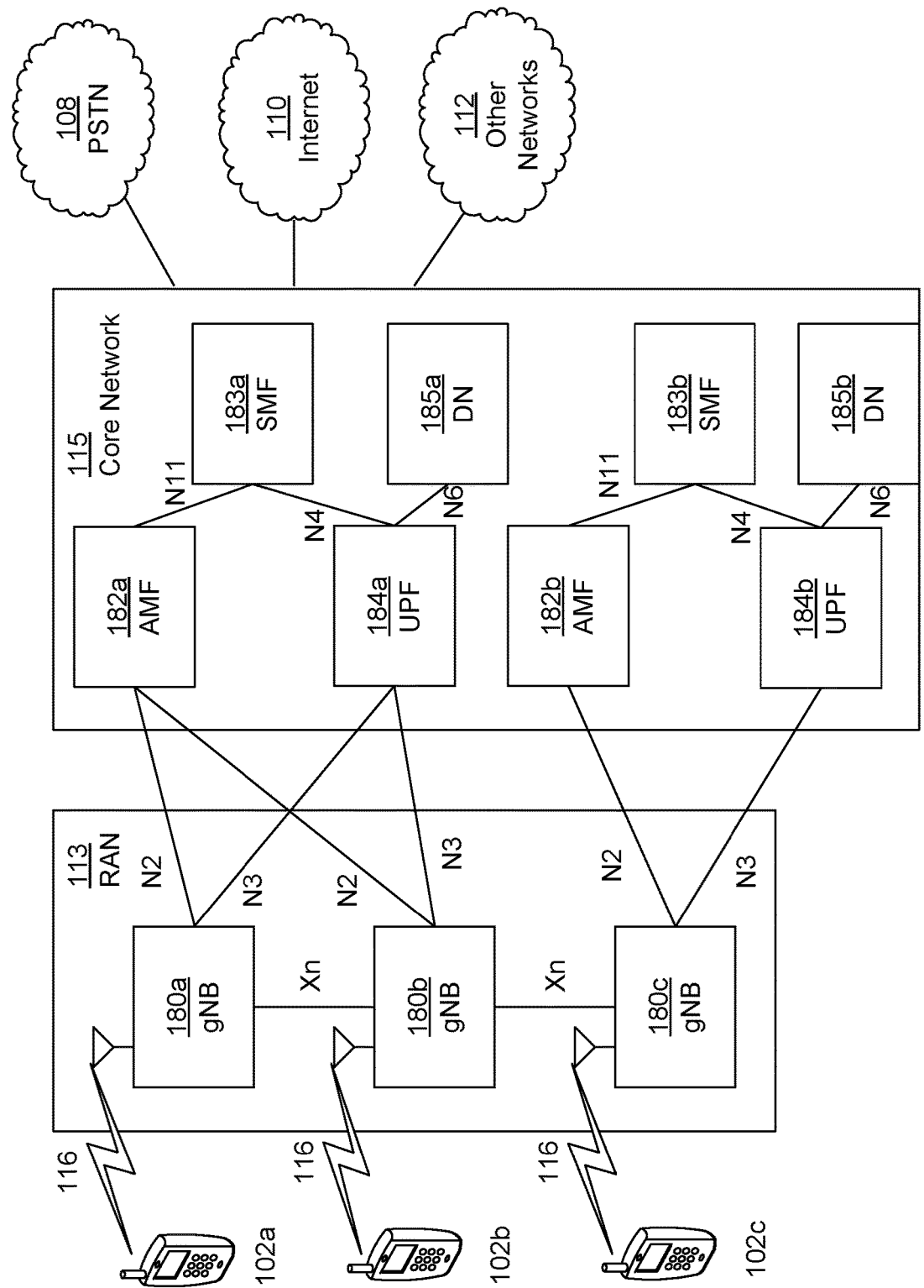
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

I. Overview and Terminology

A major issue in networks with Mbl-TRPs is to ensure that both InVeh-UEs and StrSide-UEs are connected to the proper cell in order to maintain a good quality-of-service and to avoid unnecessary signaling overhead and potential service drop due to improper handover. Similar to a heterogeneous network (HetNet) deployment, a Mbl-TRP can be configured as either in-band (same frequency band as the overlay macro-cell eNB) or out-of-band (different frequency band from the overlay macro-cell eNB). When Mbl-TRPs are introduced into a network, traditional mobility control mechanisms, for instance, as used in LTE, may have issues, at least some of which are detailed as follows.

First, in some Mbl-TRP scenarios, the traditional mobility control may cause inappropriate handover decisions. For InVeh-UEs, for example, this can happen when the vehicle moves close to an external eNB whose Reference Signal Received Power (RSRP) has become stronger than that of the Mbl-TRP due to a large transmission power differential between the external eNB and the Mbl-TRP. This may trigger measurement reporting events, which may lead to the InVeh-UEs being "wrongly" handed over to the external eNB by the network. As the vehicle moves away from the external eNB, the InVeh-UEs may subsequently be handed over back to the Mbl-TRP, leading to the so-called "ping-pong" effect. Meanwhile, such effect can also occur for StrSide-UEs, for example, when a vehicle carrying a Mbl-TRP stops at some location close to the StrSide-UEs. In this scenario, it is advantageous to prevent the StrSide-UEs from handing over to the Mbl-TRP in order to avoid the potential unnecessary handover and ping ponging. In addition, allowing StrSide-UEs to camp on the Mbl-TRP may cause a capacity issue as the Mbl-TRP may have a limited capacity dimensioned to the maximum number of InVeh-UEs.

Second, in traditional mobility control schemes, UEs in either idle or connected mode need to continually measure the RSRP of a list of cells. A negative effect of such continuous measuring in a network with Mbl-TRPs is the potential for excessive signaling overhead associated with reporting by a large number of InVeh-UEs, which may further cause radio signaling congestion. In general, InVeh-UEs are normally expected to be camped on or connected to a Mbl-TRP rather than an external eNB due to the lower path loss. Ideally, there is no need for InVeh-UEs to report the measurements from static eNBs or other Mbl-TRPs when connected to the Mbl-TRP.

Third, out-of-band Mbl-TRPs may also be configured in some scenarios for optimizing the network planning. In this case, for mobility from an external eNB to the Mbl-TRP, StrSide-UEs need first to discover the Mbl-TRP through inter-frequency measurements. Inter-frequency measurements usually rely on the use of periodic (or non-periodic), gap-assisted measurements, which inherently would interrupt the DL/UL transmission (unless the UEs are equipped with more than one receiver). To avoid too many interruption or unnecessary measurements, conditions to trigger inter-frequency measurement of a possible Mbl-TRP should be carefully designed.

II. Mbl-TRP Discovery

In this section, embodiments to enable a UE to determine whether the source of a signal is a Fxd-TRP (e.g., a conventional base station) or a mobile transmission point (Mbl-TRP) are provided.

Figure 2:
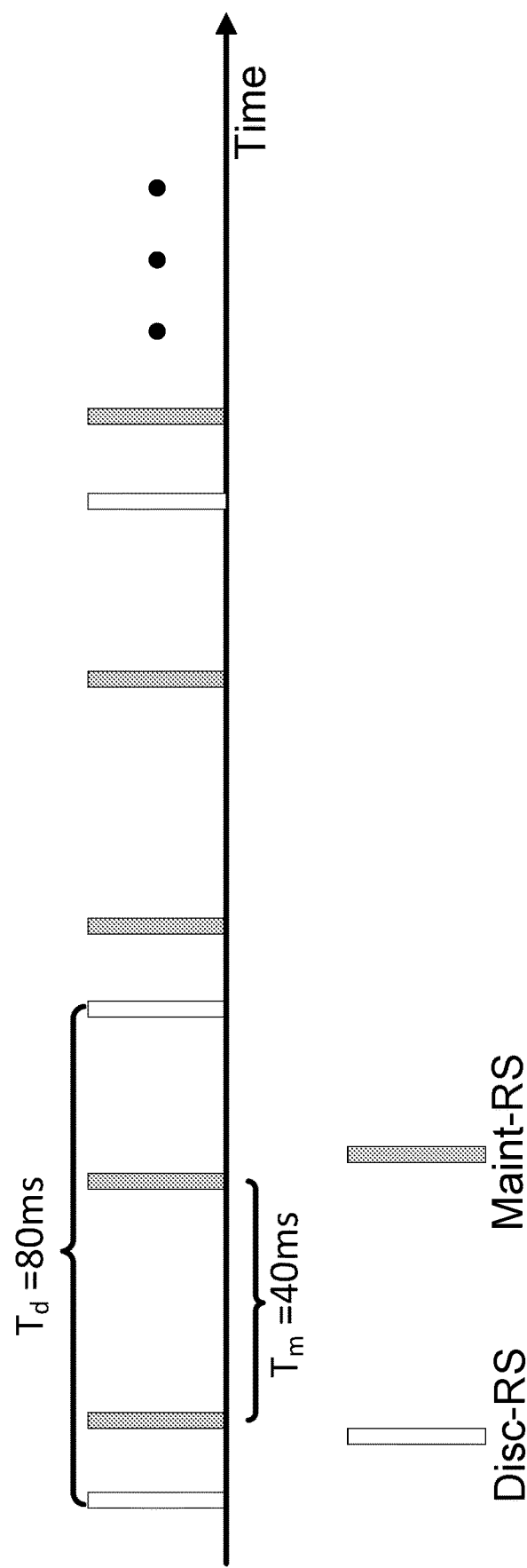
FIG. 2 is a timing diagram illustrating timing of the Disc-RS and Maint-RS signals in accordance with an exemplary embodiment.

Two Types of Synchronization Signals are Transmitted by Mbl-TRPs: One for Mbl-TRP Discovery and One for Maintenance In a first example embodiment, the Mbl-TRP may be configured to transmit two types of synchronization signals, namely, a discovery reference signal (Disc-RS) and a maintenance reference signal (Maint-RS). This concept is illustrated in FIG. 2.

The Disc-RS and Maint-RS may be transmitted periodically, potentially with different periodicity and time offset values. For example as illustrated in FIG. 2, the Disc-RS is transmitted with a periodicity of Td (in this example Td equals 80 ms) while the Maint-RS is transmitted with a periodicity of Tm (in this example Tm equals 40 ms). Both Td and Tm may be fixed in the specifications or may be configurable by the network. Optionally, they may take the different values based on the performance requirements for cell acquisition and maintenance.

In general, the Disc-RS may be used by a UE in either idle or connected modes for normal LTE operations. For example, the Disc-RS may be used for cell identification and synchronization for subsequent cell selection/reselection by UEs in idle mode and for cell measurement by UEs in connected mode. One specific example of the Disc-RS may be the combination of PSS/SSS (Primary Synchronization Signal/Secondary Synchronization Signal) and the Cell-Specific Reference Signal (CRS) defined in LTE, where the PSS/SSS may be used for cell identification and frame level and symbol level synchronization. The quality of the cell may be measured on the CRS.

The Disc-RS may be configured with different characteristics for UEs in different modes, for example, different periodicity and/or signal type. One example may be the small cell discovery reference signal defined in LTE R12 for small cell enhancement. For a small cell in ON status, the Disc-RS may be the PSS/SSS and CRS for normal LTE operations. For a small cell in OFF status, the Disc-RS may be the small cell discovery reference signal. The latter may be a combination of PSS/SSS, CRS, and Channel State Information Reference Signal (CSI-RS), which may be used for cell discovery and measurement for UE in connected mode only during the Disc-RS Occasions. Another example of Disc-RS may be the NR PSS/SSS and the Mobility Reference signal (MRS) in NR. To be more specific, a UE in idle mode may monitor the NR PSS/SSS less often while a UE in connected mode may monitor the MRS more often.

The Maint-RS, on the other hand, may be used by a UE in connected mode, or more generally when associated with (e.g., camped in idle mode) the Mbl-TRP, for maintaining connection to the Mbl-TRP and for measuring the signal quality of the Mbl-TRP. Similar to the Disc-RS, the Maint-RS may also be configured to be different depending on whether the UEs connected to it are in idle mode or connected mode. For example, the Maint-RS may be configured to be transmitted more frequently if the Mbl-TRP is active for at least one connected UE. On the other hand, the Mbl-TRP may be configured to transmit the Maint-RS less frequently when only UEs in idle-mode are associated with the Mbl-TRP.

Disc-RS is Received by the UE to Determine the Presence of a Mbl-TRP Based on Signature Sequence Characteristics The UE in idle mode may use the Disc-RS, for example, for cell initial access, symbol and frame level synchronization, and/or cell identification. In one specific example, in which the Disc-RS is the PSS/SSS in an LTE system, PSS and SSS may be used for symbol level and frame level synchronizations and also for cell identification. A UE currently connected to a Fxd-TRP may also use the Disc-RS, for example, for Mbl-TRP detection, Mbl-TRP cell synchronization, and/or cell measurement purposes.

In a first set of approaches, UEs may be configured to differentiate a Mbl-TRP from a Fxd-TRP based on the characteristics of at least one of the received synchronization signals. For example, a first set of signature sequence characteristics may be used for Fxd-TRPs and a second set of signature sequences characteristics may be used for Mbl-TRPs. The UE may receive a synchronization signal and determine the characteristics of the signature sequence. Based on those characteristics, the UE may then determine the category of the TRP (Mbl-TRP or Fxd-TRP).

More specifically, the UE may use one or more of the following signal characteristics to determine the TRP category:

Time (e.g., time offset relative to frame timing, periodicity, etc.);
Set of Physical Resource Blocks (PRBs) over which it is transmitted (or frequency);
Beam, or beam parameter. For example, a Fxd-TRP may transmit a synchronization signal using a wide beam, whereas a Mbl-TRP may transmit a synchronization signal using a narrow-beam. A UE may distinguish between a wide beam transmission and a swept narrow beam transmission, for instance, by detecting time dependent aspects of a swept beam, such as cyclical timing aspects and/or cyclical signal strength aspects. Alternatively, the UE may distinguish between a wide beam transmission and a swept narrow beam transmission based on the channel characteristics, e.g., the maximum delay spread of multipath channel experienced by the signals. The multipath channel associated with a narrow beam transmission may have smaller maximum delay spread than that associated with a wide beam transmission;
Synchronization signal block (SS block) used to transmit the synchronization signal;
Signal sequence type (e.g. Zadoff-Chu, Gold, Kasami, etc.); and/or
Sequence parameter (e.g., for Zadoff-Chu, a different root and/or cyclic shift can be used).

In another embodiment, a UE may first detect the presence of a Disc-RS and, from such, may determine the presence of a TRP (which, at first, could be either a Mbl-TRP or a Fxd-TRP depending on whether or not a Maint-RS associated with the Disc-RS is further detected). The UE may then attempt to detect a Maint-RS associated with the Disc-RS in order to determine whether it is a Mbl-TRP or a Fxd-TRP. In order to determine whether the TRP is a Mbl-TRP or a Fxd-TRP, for example, a Maint-RS detection timer may be started upon detection of the Disc-RS. Upon successful detection of a Maint-RS associated with the Disc-RS (e.g., before expiration of the Maint-RS detection timer), the UE may determine that it has detected a Mbl-TRP. If no associated Maint-RS is detected before the Maint-RS detection timer expires, the UE may determine that it has detected a Fxd-TRP. One potential benefit of this embodiment is that the Mbl-TRP and the Fxd-TRP may reuse the same signal sequence type and sequence parameters, thus preventing excessive use of the limited number of unique sequences.

A Maint-RS may be considered to be associated with a Disc-RS if at least one of its signal characteristics is determined from at least one signal characteristic of the Disc-RS. For instance, the UE may use at least one of the following to enable detection of a Maint-RS associated with a previously detected Disc-RS:

Time. For example, there may be a specific time offset (or set of time offsets) between a Disc-RS and a Maint-RS associated with a single Mbl-TRP. For example, a Disc-RS received in symbol n of subframe k may be associated with a set of Maint-RS transmitted in symbol m=n+i or subframes k+x, k+y, k+z;
Frequency. For example, there may be a predetermined frequency offset between a Disc-RS and a Maint-RS associated with the same Mbl-TRP;
Beam or beam parameter. For example, a beam used to transmit a Disc-RS may indicate a possible beam used for Maint-RS;
Signal sequence type (e.g. Zadoff-Chu, Gold, Kasami, etc.); and/or
Sequence parameter (e.g. for Zadoff-Chu, root, cyclic shift). For example, a sequence parameter of a Disc-RS may indicate a transmission parameter of a Maint-RS from the same Mbl-TRP.

In yet another embodiment, the MBL-TRP may be configured so as to not transmit a Maint-RS when there are no WTRU's associated with it (e.g., in order to conserve power and/or radio resources). In such embodiments, upon detection of the presence of a Disc-RS, a UE may initiate an UL transmission to trigger the Mbl-TRP to start transmitting a Maint-RS.

Maint-RS is Received by the UE to Maintain the Connection to the Mbl-TRP

A UE in connected mode, or more generally, associated with (e.g., camped in Idle mode) a Mbl-TRP, may use the Maint-RS, for example, for maintaining connection to the Mbl-TRP and for measuring the signal quality of the Mbl-TRP. In a first set of embodiments, the Maint-RS may be configured with different characteristics from those of the Disc-RS. For example, the Maint-RS and the Disc-RS may be transmitted using different timing offsets relative to the frame timing and/or using different periodicities. The UE associated with the Mbl-TRP may receive the Maint-RS and detect its corresponding characteristics, based on which, the UE may measure the strength and quality of the Mbl-TRP and maintain connection to the Mbl-TRP.

To be more specific, the UE may use one or more of the following signal characteristics to identify the Maint-RS and differentiate the Maint-RS from the Disc-RS:

Time (e.g., offset relative to frame timing, periodicity, etc.);
Set of PRBs over which it is transmitted (or frequency);
Beam or beam parameter. For example, a Disc-RS may be transmitted using beam sweeping and may thus be transmitted over a plurality of beams whereas a Maint-RS may be transmitted using a subset of beams (e.g. a single beam);

Synchronization signal block (SS block);

Signal sequence type (e.g., Zadoff-Chu, Gold, Kasami, etc.); and/or

Sequence parameter (e.g. root sequence and cyclic shift for a Zadoff-Chu sequence).

Maint-RS Signal is Possibly Superimposed on Data to Reduce Resource Overhead

In another embodiment, the Maint-RS may use the same time and frequency resources as the downlink payload data. Specifically, the Maint-RS may be superimposed onto the downlink payload data using the same time and frequency resources and be separable from the downlink payload data by the receiver because of the known signal characteristics of the Maint-RS. The UE may monitor certain time and frequency resources known to be potentjally occupied by both downlink payload data and the Maint-RS, and detect the Maint-RS based on the characteristics of the Maint-RS. More specifically, the UE may rely on one or more of the following characteristics to detect the Maint-RS:

Low transmission power of the Maint-RS to minimize the interference towards the downlink payload data; and/or Long signature sequence to achieve high processing gain to detect the Maint-RS from the downlink payload data.

The benefit of this approach is that the Maint-RS may be transmitted without dedicated resources. In practice, depending on the design, it may also imply that the UE may require an advanced receiver architecture (e.g., successive interference cancellation based receiver) in order to detect the data.

Figure 3:
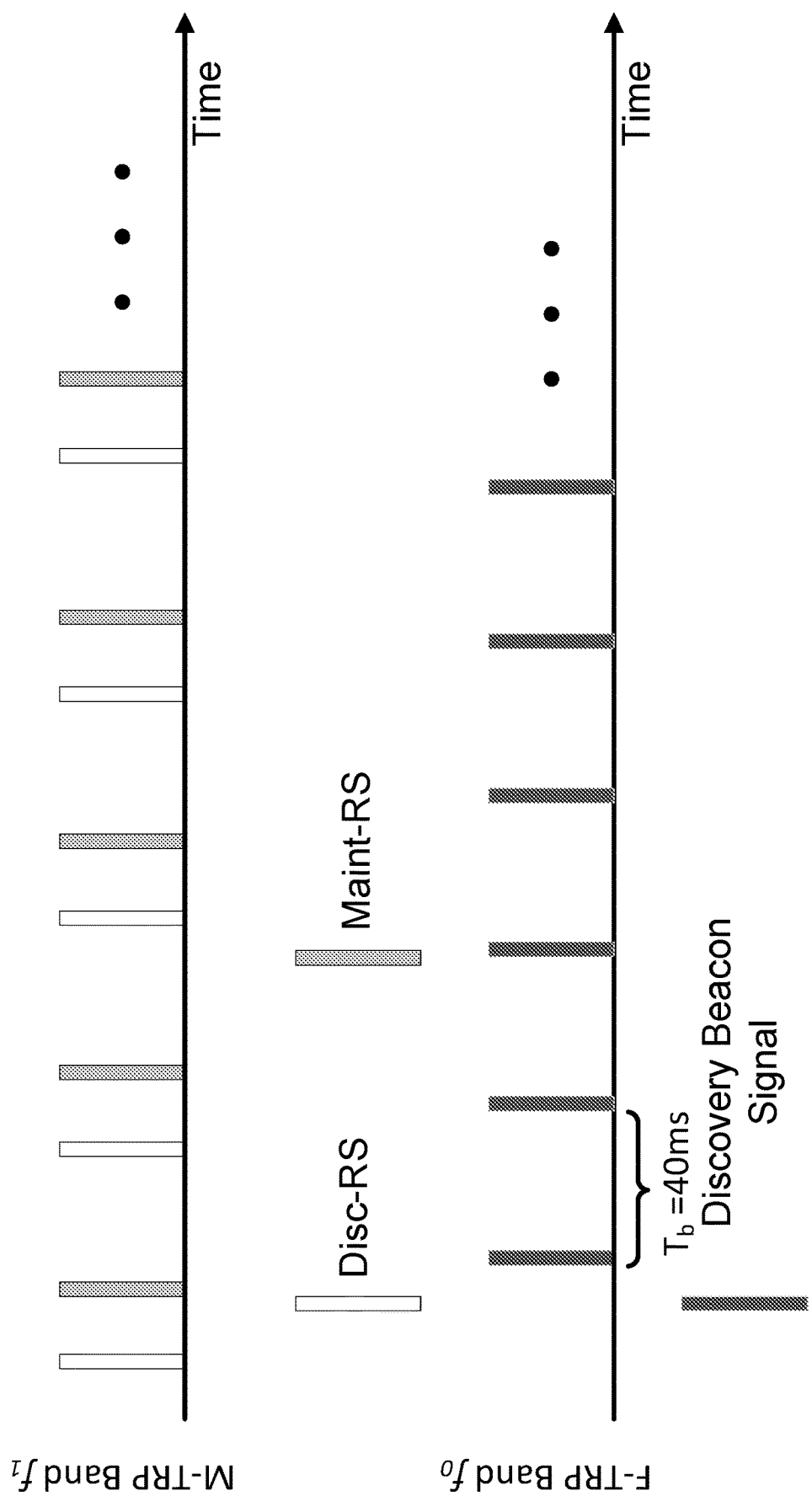
FIG. 3 is a timing diagram illustrating timing of the Disc-RS, Maint-RS and Discovery Beacon Signal in accordance with another exemplary embodiment.

Discovery Signal is Received By the UE to Determine the Presence of a Mbl-TRP Operating on a Different Frequency In yet another embodiment, the Mbl-TRP may be configured in the out-of-band mode, i.e., the Mbl-TRPs operate in a frequency or carrier different from the Fxd-TRPs in the network. In this scenario, the Mbl-TRPs may be configured to also transmit a discovery beacon signal on the Fxd-TRP frequency. This concept is illustrated in FIG. 3.

The discovery beacon signal may be transmitted periodically with configurable periodicity and time offset values. As an illustrative example, in FIG. 3, the discovery beacon signal is transmitted with a periodicity of Tb=40 ms.

In one option, the discovery beacon signal may be designed using a similar structure to the Maint-RS and/or Disc-RS as described above. In another option, some existing mechanisms such as small cell discovery may be used for this purpose. For example, the UE in either idle mode or when connected to the Fxd-TRP may monitor the discovery beacon signal, for example, for Mbl-TRP discovery. One specific example of the discovery beacon signal may be the Device-to-Device (D2D)-type discovery signal used in LTE D2D proximity services. See, e.g., 3GPP TS 36.300 v12.10.0, § 23.11.

Another approach is to use the small cells discovery approach. A UE may be configured with time instances (or occasions) where it may attempt to detect the discovery beacon signal. Upon detection of a discovery beacon signal and other criteria for inter-frequency measurement as discussed below, the UE may use a pre-configured and/or associated measurement gap to attempt to detect the Disc-RS/Maint-RS of the Mbl-TRP in its appropriate frequency. Alternatively, upon detecting a discovery beacon signal, the UE may indicate to its serving TRP the need for a measurement gap to attempt detection of Mbl-TRPs.

To detect the presence of the Mbl-TRP, in the first set of embodiments, the UE may be configured to identify the discovery beacon signal based on the characteristics of the received discovery signal, such as in ways similar to any of the ways described above in connection with detecting the Maint-RS.

UE Uses Inter-RAT Signals/Messages to Detect Presence of a Mbl-TRP

In yet another embodiment, the UEs may exploit one or more of the following forms of inter-RAT signals or messages to detect the presence of a Mbl-TRP in out-of-band mode:

Wi-Fi and Bluetooth signals transmitted from the access points installed in the same vehicle in which the Mbl-TRP is installed; and/or Vehicular safety messages periodically transmitted by the vehicles, which may include the vehicle ID, location, speed, and heading information. One specific example of the safety messages may be the V2V/V2P messages transmitted by the vehicle using DSRC or other V2x technology such as what is defined in LTE Release 14 for Vehicle-to-Vehicle (V2V) services. See, e.g., 3GPP TS 22.185, V14.2.1 § 4.1.2.

More specifically, the UE may be configured to monitor and/or receive one or more of the above inter-RAT signals/messages. For example, the UE may be configured by the mobile operator network (e.g., via the cellular link) or pre-configured (e.g., via its UICC or other pre-configuration methods) with the inter-RAT parameters to consider. The UE may further be configured by the network to enable this inter-RAT discovery.

III. Conditions to Trigger Measurement Report in the Presence of Mbl-TRP

This section discusses embodiments for a UE to determine when to send a measurement report to the network. For a possible handover from a Fxd-TRP to a Mbl-TRP or from a Mbl-TRP to a Fxd-TRP, the UE may be configured with at least one of the following criteria for reporting measurement data:

The RSRP or the like (e.g., received power measurement on a subset of resources) of the Mbl-TRP becomes better than a pre-configured threshold;

The RSRP or the like (e.g. received power measurement on a subset of resources) of the Fxd-TRP becomes worse than a pre-configured threshold;

Multiple RSRP measurements or the like (e.g. received power measurement on a subset of resources) of the Mbl-TRP indicate stability with respect to the channel between the Mbl-TRP and the UE (for example, a UE may perform a set of x RSRP measurements at different, possibly configurable, time instances; and, upon determining that at least y (where y<=x) measurements are within a threshold value of each other, the UE may be triggered to report the set of measurements, and/or the average measurement, and/or the number of measurements y that fall within a threshold value of the reported measurement);

The UE's speed relative to the Mbl-TRP is below another pre-configured threshold, i.e., indicative of a likelihood that the UE is an InVeh-UE with the Mbl-TRP;

The UE's speed relative to the Mbl-TRP is greater than a pre-configured threshold, i.e., indicative of a likelihood that the UE is mobile but is not in the same vehicle as the Mbl-TRP; and/or The UE's speed relative to the Mbl-TRP fluctuates by a value greater than a threshold, i.e., indicative of a likelihood that the UE is mobile but is not in the same vehicle as the Mbl-TRP (for example, a UE may determine its speed relative to the Mbl-TRP at multiple, say x, occasions, and, if y such measurements (where y<=x) vary by an amount greater than a threshold value from some normalized value, the UE may consider a measurement reporting criteria to have been achieved. Examples of such normalized values may include:

a specific relative speed measurement taken on a possibly configurable occasion;

the average relative speed measurement taken over a set of occasions; and/or a maximum or minimum relative speed measurement taken in one of the x measurement occasions.

In one embodiment, the UE may be configured with a first subset of conditions, which may be one or more of the above conditions, to initiate further consideration of whether to trigger a measurement report. Specifically, the UE may then be configured with a second subset of conditions, which may be one or more of the above conditions. The UE may be configured to trigger the reporting events only if both of the two subsets of conditions are met. For example, the UE may be configured with the first condition being that the UE's relative speed to the Mbl-TRP is below a pre-configured threshold. Upon the satisfaction of the first condition, the UE may determine whether a second subset of conditions are met. As a more specific example, the second subset of conditions may be that the RSRP of the Mbl-TRP becomes better than a pre-configured threshold and/or the RSRP of the Fxd-TRP becomes worse than a pre-configured threshold.

The UE may report measurements for one (or more) Mbl-TRP along with one (or more) Fxd-TRP. In an embodiment, when a UE is triggered to report measurements for a Mbl-TRP, the UE may also report all valid Fxd-TRP measurements, regardless of whether those measurements satisfy their own individual reporting criteria. The thresholds for reporting Mbl-TRP or Fxd-TRP measurements may be different depending on whether the TRP being measured is a Mbl-TRP or a Fxd-TRP. Furthermore, the thresholds for reporting Mbl-TRP or Fxd-TRP measurements may depend on the TRP type that the UE is currently served by (e.g., whether the UE is an InVeh-UE or an StrSide-UE).

UE is Configured with a Criterion Based on Relative Speed Estimation

As noted above, the UE may determine whether to send a measurement report based at least partially on a relative speed measurement (or speed estimate) and one or more configured thresholds.

For example, once the UE detects the Disc-RS transmitted by a Mbl-TRP, the UE may be configured to estimate its speed relative to the Mbl-TRP. The UE may estimate its speed, for example, based on estimating the channel coherence time using the signal characteristics of the received reference signals in a similar way as described below in connection with the section of this specification concerning condition for a UE to send an inter-frequency measurement request, or based on multiple consecutive RSRP measurements of the Mbl-TRP, which indicate stability with respect to the channel between the UE and the Mbl-TRP. Based on the estimated relative speed, the UE may further categorize the speed level. For example, the UE may decide whether the relative speed is "low" or "high" based on one or more configured thresholds.

In this context, the UE may be in one of four scenarios, which are summarized in Table 1.

TABLE 1

| | Speed level relative to Mbl-TRP | |
|---|---|---|
| | Low | High |
| Scenario | 1) UE is "InVeh-UE" | 1) UE is on a different vehicle than the Mbl-TRP and moving in a different direction and/or at a different speed. |
| | 2) UE is "StrSide-UE" and Mbl-TRP stopped close to the UE (e.g. Mbl-TRP is in a vehicle that is stopped at a bus stop or a red light) | 2) UE is "StrSide-UE", and Mbl-TRP is moving. |

In one embodiment, the UE may be configured to trigger measurement reporting if, as a first condition, the UE's estimated speed level relative to the Mbl-TRP is below a pre-configured threshold, i.e., the relative speed level is "low", and a second subset of one or more conditions is met. In this case, the UE may be classified as an InVeh-UE according to Table 1. Therefore, it may be beneficial to consider a possible handover to the Mbl-TRP due to the low path loss between the Mbl-TRP and the UEs in the cabin and/or because the InVeh-UE's position may be fixed relative to the Mbl-TRP, and thus it is reasonable to assume that the two are moving together, i.e., that the UE is an "InVeh-UE" relative to that Mbl-TRP. On the other hand, if the UE's speed relative to the Mbl-TRP is "high", then it may be reasonable to assume that the UE is not in the Mbl-TRP vehicle, and thus the UE may be configured to not send the measurement report (i.e., conceptually, the UE "ignores" the Mbl-TRP and stays connected the Fxd-TRP).

Estimation of Level of Relative Speed Based on Radio Measurements

The level of the UE's speed relative to the Mbl-TRP may be estimated from a higher layer based on radio measurements, e.g., RSRP or the like based on Disc-RS, CRS or other forms of reference signals transmitted by the Mbl-TRP. The UE may determine its relative speed using multiple radio measurements in a pre-configured time frame. In one approach, the UE measures the fluctuations of the measured RSRP over time and compares them with a threshold (e.g., a small threshold). If a certain percentage of such measurements (e.g., half of the measurements) are within a predetermined range of each other, the UE may consider its speed relative to the Mbl-TRP to be low. Otherwise, it may consider its speed relative to the Mbl-TRP to be high.

In another approach, the UE may use statistics of multiple measured RSRPs or the like, for example, the second-order moment, to determine the level of relative speed. If the measured second-order moment is small, then the UE considers its relative speed low and vice versa.

Estimation of Level of Relative Speed Based on V2X Messages

In yet other embodiments, the UE's relative speed with respect to a Mbl-TRP may be estimated based on received Vehicle to-Vehicle or Vehicle-to-Infrastructure (V2X) messages. Specifically, the UE may receive V2X messages transmitted (either periodically or event-triggered) by the vehicle carrying the Mbl-TRP. The V2X messages may contain the identification of the vehicle and the Mbl-TRP, speed, direction and location of the vehicle. In one embodiment, the UE may obtain its own absolute speed and direction using higher layer applications, such as GPS. The UE would then compare its speed and/or direction to the speed and/or direction reported in the V2X message(s) in order to make a determination as to its speed and/or direction relative to the Mbl-TRP's.

In another embodiment, the UE may obtain its speed and/or direction using network-assisted location determination methods. For example, the UE may measure the time-of-arrival (TOA) of reference signals transmitted by multiple Fxd-TRPs within the NR network and subsequently the UE may estimate its speed and direction using location measurements on different time occasions.

Determination of Different Thresholds Associated with Measurement Reporting Conditions The UE's estimate of radio link quality of the serving or target cells in terms of RSRP or the like may be compared to one or more configurable thresholds for purposes of determining whether or not to send a measurement report. In one approach, the threshold may be determined based on hypothetical or real transmission of the reference signals, e.g., through simulation/field test. The threshold may be set to a value that guarantees a certain level of probability of detection of the reference signals, e.g., 99%. An offset may be added to the threshold to account for factors in practical scenarios, such as interference, small-scale fading, receiver noise, and so on.

Additionally, the UE's relative speed estimate may be compared to another configurable threshold for purposes of determining whether or not to send a measurement report. One approach is to set the threshold to be a small number, e.g., around 3-5 km/h, to ensure that the UE is essentially travelling inside the vehicle while also considering that the UE may walk in the vehicle, e.g., in a train.

The UE may be configured with the thresholds via Radio Resource Control (RRC) signaling, for example, when setting up the measurements, or the thresholds may be fixed in the specifications.

Mbl-TRP Uses Speed-Dependent Disc-RS Activation to Avoid Unnecessary Handover

One potential issue with the above-described relative speed-based embodiment is that a UE may determine that its relative speed is "low" yet still be an StrSide-UE (the scenario in the lower left quadrant of Table 1). This may happen, for example, when the Mbl-TRP vehicle stops or moves slowly on the street while close to an StrSide-UE. In this case, sending a measurement report may not be beneficial for the UE as it is not an InVeh-UE and thus it may cause unnecessary signaling, possibly unneeded handover, and possibly undesirable "ping-pong" effect. Thus, as noted above, there may be an ambiguity if the UE relies only on the estimation of the relative speed with respect to the Mbl-TRP.

Figure 4:
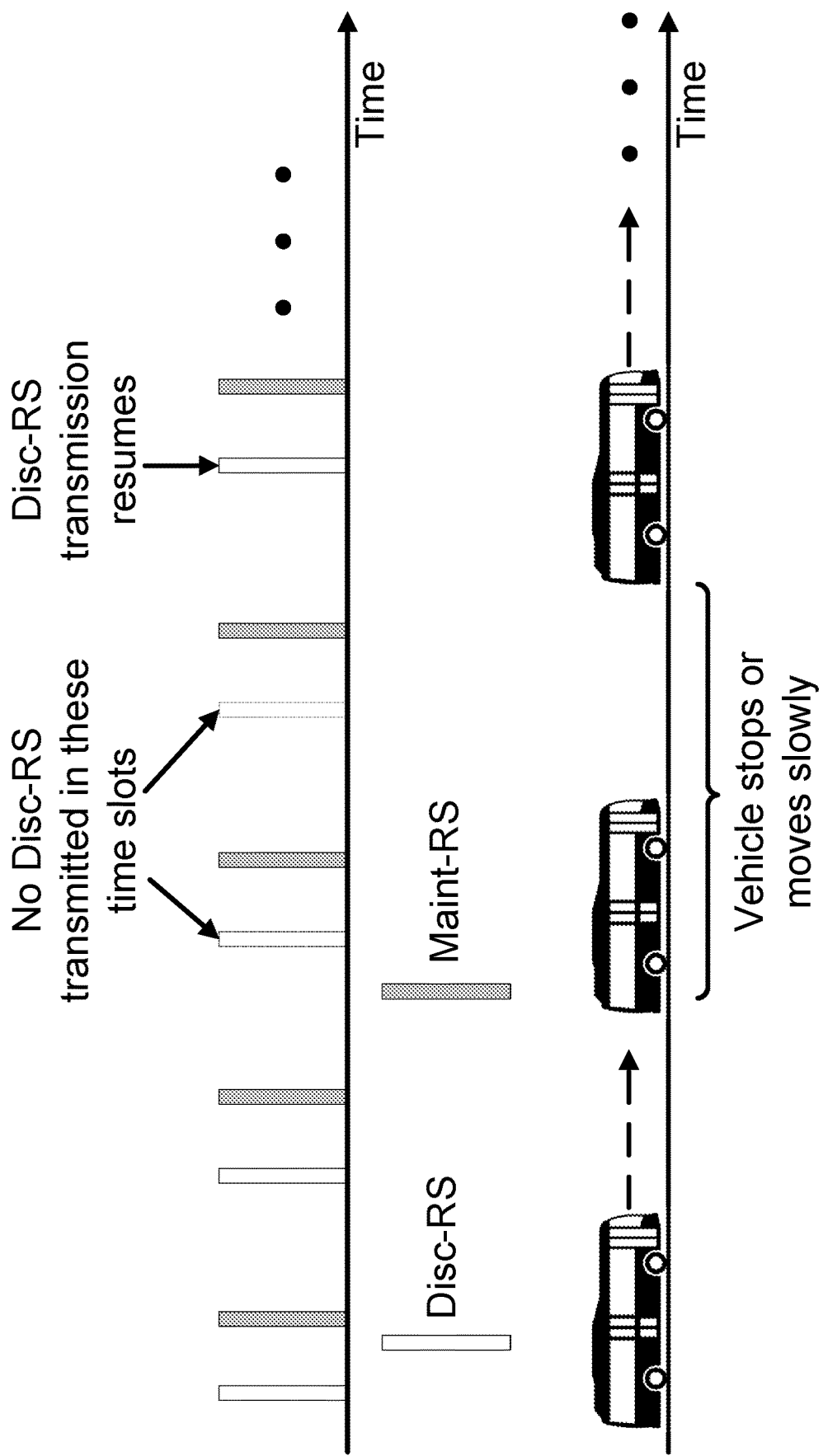
FIG. 4 is a timing diagram illustrating timing of the Disc-RS and Maint-RS in accordance with a further exemplary embodiment.

In one exemplary embodiment adapted to address this scenario, the Mbl-TRP may be configured to transmit its Disc-RS as a function of the Mbl-TRP's speed, a concept referred to herein as "speed-dependent Disc-RS activation". More specifically, the Mbl-TRP may transmit the Disc-RS only if the absolute speed of the Mbl-TRP vehicle is above a pre-configured threshold, e.g., 15 km/h. One of the potential benefits of speed-dependent Disc-RS activation is to effectively prevent an StrSide-UE from being handed over to a Mbl-TRP. The proposed concept is illustrated in FIG. 4.

Summary of UE Sending Measurement Report

Figure 5:
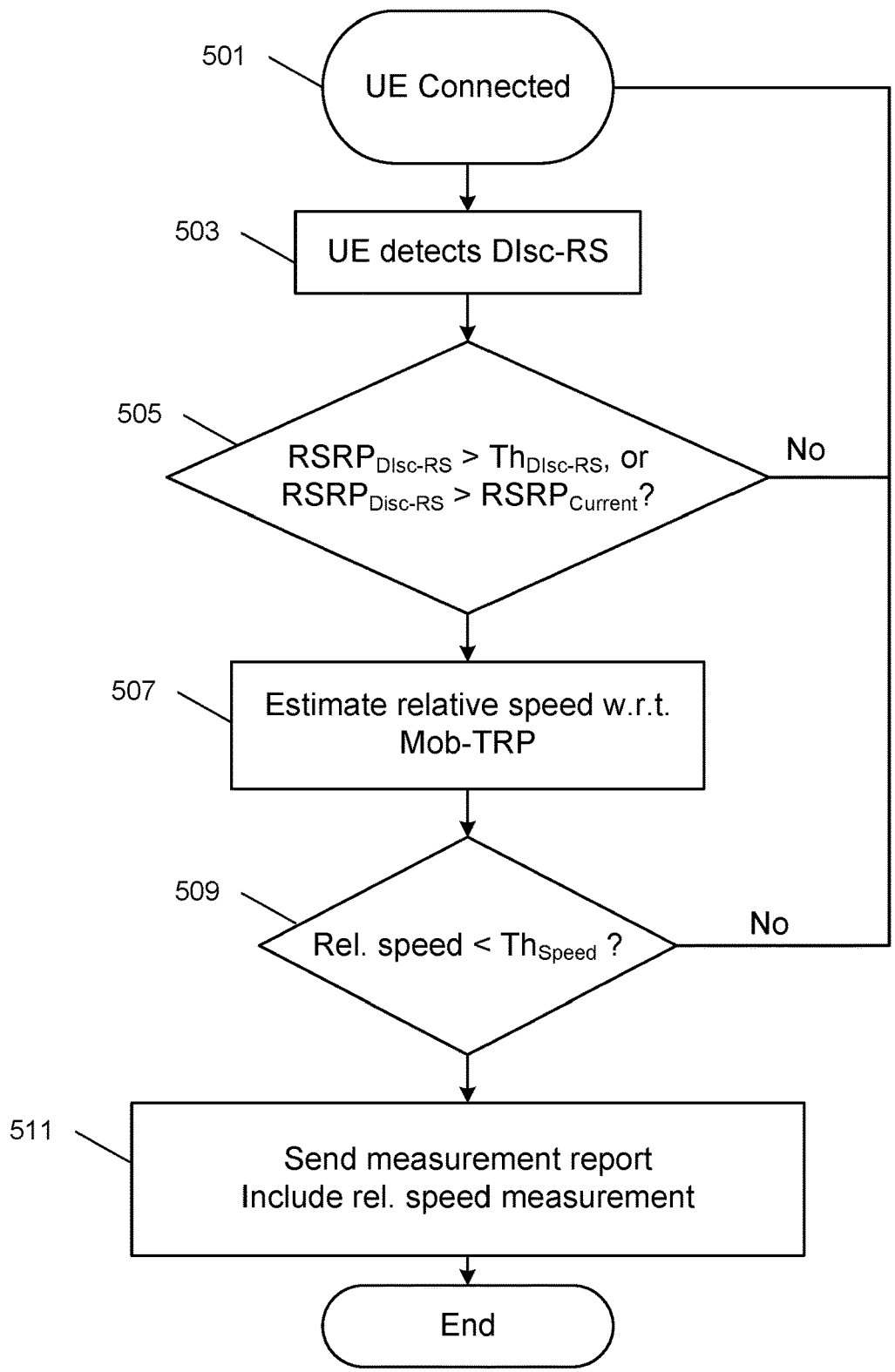
FIG. 5 is a flowchart illustrating a process for a UE to detect a Mbl-TRP, determine whether to send a measurement report, and send the measurement report in accordance with an exemplary embodiment.

FIG. 5 is a flowchart illustrating a procedure for the detection of a Mbl-TRP and the triggering of a measurement report in accordance with an exemplary embodiment. For a UE connected to a Fxd-TRP or possibly connected to another Mbl-TRP (as shown at step 501), in step 503, the UE detects the Disc-RS transmitted by a Mbl-TRP. Then, in step 505, the UE uses one or more of the conditions discussed above for triggering a measurement report in the presence of Mbl-TRP, e.g., the RSRP of the detected Disc-RS (RSRP$_{Disc-RS}$) being above a threshold (Th$_{Disc-RS}$) and/or the RSRP of the detected Disc-RS becoming better than that of the current cell (RSRPCurrent) to decide whether to potentially send a measurement report. If this first condition is not satisfied in step 505, the UE does not send a measurement report and remains connected to the current cell. If, on the other hand, this first condition is satisfied in step 505, the UE proceeds to step 507, where it estimates its speed relative to the Mbl-TRP (or possibly its absolute speed). Next, in step 509, the UE determines if the estimated speed is above or below a threshold speed (Th$_{speed}$) If the estimated relative speed is deemed below Th$_{Speed}$ (thus indicating that the UE is probably onboard the vehicle with the Mbl-TRP, i.e., is a inVeh-UE), flow proceeds to step 511, in which the UE sends a measurement report, and, in some embodiments, the estimation of the relative speed, to the TRP of the current cell. If the second condition (or set of conditions) is not met, the UE does not send measurement report and remains connected 501 to the current cell.

Conditions for UE to Send Inter-Frequency Measurement Request

Embodiments for the UE to request inter-frequency measurements of a Mbl-TRP operating out-of-band of the Fxd-TRP to which the UE is currently attached (or otherwise associated with) are provided in this section.

As previously described, the UE may be configured to first detect the presence of the discovery beacon signals transmitted by the Mbl-TRP on the frequency band of the Fxd-TRP. The actual carrier frequency for the out-of-band Mbl-TRP may be pre-configured, for example, via RRC (e.g., via dedicated signaling or over the system information), or it could be provisioned by the network operator in the Universal Subscriber Identity Module (USIM).

UE Detects the Presence of the Mbl-TRP by Receiving the Beacon Signals

In one embodiment, the UE may be configured to monitor the discovery beacon signal, which may be transmitted by the Mbl-TRP on the Fxd-TRP frequency, as discussed above. Also as previously noted, the characteristics of the discovery beacon signal may be configurable and the UE may be configured to detect the presence of the discovery beacon signal based on these signal characteristics.

Such configuration may be static, semi-static, or dynamic. For example, the network may determine that a UE is requiring many handovers in a short period of time (possibly indicating that the UE is mobile, e.g., an InVeh-UE). Therefore, the network may configure the UE to monitor for the presence of Mbl-TRP beacon signals, possibly also indicating appropriate signal characteristics to seek out.

In yet another embodiment as previously discussed, the UE also may be configured to monitor one or more inter-RAT signals or messages to detect the Mbl-TRP.

UE Makes Decision Whether or Not to Send Inter-Frequency Measurement Requests Based on Relative Speed The UE may be configured to estimate its speed relative to some fixed reference points to determine whether it is a StrSide-UE or an InVeh-UE. One specific example of the fixed reference point may be the Fxd-TRP of the serving cell when the UE is in idle mode or the Fxd-TRP to which the UE is connected. For example, the UE may use the synchronization signals and/or reference signals transmitted by the Fxd-TRP to estimate its speed relative to the Fxd-TRP. Depending on the estimated relative speed level, there may exist several possible scenarios as listed in Table 2.

TABLE 2

| | Speed level relative to Fxd-TRP | |
|---|---|---|
| | Low | High |
| Scenario | 3) UE is a StrSide-UE<br>4) UE is a StrSide-UE in transition to InVeh-UE and the vehicles stops on the street (e.g., bus stops, red light, traffic congestion and etc.) | 3) UE is an InVeh-UE<br>4) UE is a high-speed UE in other vehicle |

Based on the above listed scenarios, the UE may be configured to send the inter-frequency measurement requests to the network if the UE's relative speed is above a configured threshold, i.e., its relative speed is deemed "High". Otherwise, the UE may be configured not to send the inter-frequency measurement requests. One of the benefits of this approach is that a StrSide-UE may avoid sending unnecessary measurement requests and performing unnecessary inter-frequency measurements, which may be more efficient from the perspectives of both the signaling overhead and the UE's energy consumption. A second advantage may be that, for UEs getting on the vehicle (i.e., StrSide-UE in transition to InVeh-UE), it is beneficial for the UEs to stay connected to the Fxd-TRP because, for UEs in a low mobility state, the RSRP of the Fxd-TRP may be sufficiently high for the UE to maintain a good service quality. In practice, the UE may be configured so that, when the RSRP of the Fxd-TRP becomes lower at the UE, the UE sends an inter-frequency measurement request (such as described above) and makes the appropriate measurements according to the network control, which may eventually lead the network to configure the UE to perform a handover.

The UE may also be configured with additional conditions before it will send an inter-frequency (or inter-RAT) measurement request, such as one or more of the conditions discussed above for triggering a measurement report in the presence of a Mbl-TRP. The UE may use the above relative speed-based condition as a first condition and one or more of the other conditions listed above as a set of second conditions. Once both the first and second conditions are met, the UE may send the inter-frequency measurement request to the network.

Handling High Speed UEs in Other Vehicles

Using the above relative speed-based criterion may not be sufficient to prevent UEs in other high speed vehicles from sending an inter-frequency (or inter-RAT) measurement request when undesirable. In other words, it may be difficult to differentiate a "real" InVeh-UE from UEs in other vehicles based only on relative speed.

To solve this issue, one embodiment may be to configure the UE to make a first inter-frequency measurement request. Then the UE is configured with a back-off timer (which may be pre-configured by the network) so that the UE does not make another request to the same Fxd-TRP with the same Disc-RS during the back off period. The rationale behind this embodiment is that, for a high-speed UE in another vehicle, the measured RSRP of the Mbl-TRP after the back off period expires may be sufficiently low (e.g., because the "other" vehicle containing the UE has moved further away from the vehicle with the Mbl-TRP) that a measurement report would not be triggered after the back-off timer expires (i.e., after the back off period).

Embodiments for a UE to Estimate its Speed Level Relative to a Fixed Reference Point In one embodiment, the UE may be configured to estimate its relative speed by exploiting the signal characteristics of the received reference signals from a fixed reference point. The fixed reference point may be conveniently selected as the serving Fxd-TRP for the UE. To be more specific, the UE may be configured to monitor the reference signals transmitted by its serving Fxd-TRP to estimate the channel correlation at two time instances t1 and t2 with t2−t1=T. For example, denoting the time-domain channel estimate at a specific resource block (RB) at time t by $\hat{h}(t)$, the UE may estimate the channel correlation by $$R(\tau)=E\{\hat{h}(t)\hat{h}^*(t+\tau)\}.$$

The UE may be configured with a threshold $\lambda$, which may be pre-configured by the network or signaled by the network. The UE may estimate the approximate channel coherence using the following criterion:

$$\tau_{max}=\min \tau \text{ s.t. } R(\tau) \leq \lambda.$$

To be more general, the UE may use one or more of the following reference symbols transmitted by the Fxd-TRPs for the estimation of the channel coherence time:

Cell-specific reference signal;
Demodulation reference signal;
CSI reference signal; and/or
Positioning reference signal.

The UE may determine its relative speed level based on the relation between the relative speed and the estimated channel coherence time shown in Table 3 below.

TABLE 3

| Channel coherence time | Short | Long |
|---|---|---|
| Relative speed level | High | Low |

One of the potential benefits of the above channel coherence-based estimation approach is that the estimation may be inherently integrated into the intra-frequency measurement or downlink signal reception procedure, and, therefore, no additional signaling or UE processing is required.

Alternately or additionally, the UE may estimate its absolute speed using GPS signals. Since the Fxd-TRP is a fixed point, the UE's absolute speed and relative speed to the Fxd-TRP are equivalent.

UE Configured by the Network to Perform Inter-Frequency Measurement

In a second set of approaches, the UE may be configured by the network to enable the inter-frequency measurement. More specifically, it may be a desired feature for the next-generation cellular network, e.g., 3GPP NR, to know the network topology. For example, the network may be aware of the location of the Mbl-TRPs. The network may configure the UE via higher layer signaling, such as RRC signaling, to monitor the synchronization signals of a proximate Mbl-TRP, such as the Disc-RS, when the network determines that the UE has become proximate to a Mbl-TRP.

IV. Conditions to Trigger Measurement for UE in Idle Mode

This section discusses embodiments for an idle-mode UE to perform measurements and cell selection/reselection. From the UE's energy consumption perspective, it may beneficial to limit the measurements the UE is required to perform. More specifically, the UE may be configured with at least one of the following measurement and/or cell selection/reselection conditions (note that the UE may either be camped on a Fxd-TRP or a Mbl-TRP):

The UE's speed relative to the Fxd-TRP with which it is currently associated is below a pre-configured threshold;

The UE's speed relative to the Fxd-TRP with which it is currently associated is greater than a pre-configured threshold;

The UE's speed relative to another Mbl-TRP is greater than another pre-configured threshold;

Any one or more of the conditions listed above in section III.

In order to allow a UE to perform measurement of a Mbl-TRP upon the discovery of the Mbl-TRP, a UE in idle mode but camped on a Fxd-TRP, the UE may be configured with a higher Fxd-TRP signal strength search threshold than when it detects another Fxd-TRP. That is, the UE may be configured to search and report with respect to a detected Mbl-TRP even if the signal from the Fxd-TRP with which it is currently associated is very strong. One of the potential benefits of this approach is that it ensures that the UE searches/measures the Mbl-TRP even under good quality of the Fxd-TRP's signal. More specifically, in the context of the existence of Mbl-TRPs, the fact that a UE has a strong signal from the Fxd-TRP that it is camped on does not necessarily mean that there is not a Mbl-TRP in the vicinity that is more preferable (for example, in the scenario where an idle-UE currently camped on a Fxd-TRP just got on a bus).

To save UE battery power by limiting the measurements that the UE needs to perform, in another approach, the UE may be configured to consider the operating frequency of Mbl-TRPs to be higher priority than the operating frequency of Fxd-TRPs. That is, the UE may be configured to always perform a measurement when the measurement is in a frequency band having higher priority than the frequency band of the TRP on which it is camped. This approach may allow the UE to perform measurement on the Mbl-TRP's frequency with a configurable periodicity.

In yet another approach, the Mbl-TRP may be configured to transmit a burst of cell reselection beacon signals on the Fxd-TRP's band to reduce the quality of the Fxd-TRP, thus triggering a search on the Mbl-TRP's frequency. The cell reselection beacon signals may be any signal in the frequency band of the Fxd-TRP that would cause interference in that band, including the discovery beacon signal.

In an alternative approach that is similar to what is discussed in Section III, the UE may be configured with a subset of first conditions. For example, for a UE in idle mode but camped on a Fxd-TRP, the UE may be configured with the first condition(s) being that the UE's relative speed to the Fxd-TRP is greater than a pre-configured threshold, i.e., the UE may be an InVeh-UE. Once the first condition and one or more of the other conditions are met by the UE, the UE may be configured to take measurements on the Mbl-TRP's frequency and, if appropriate, reselect to the Mbl-TRP. In another example, for a UE in idle mode but camped on a Mbl-TRP, the UE may be configured with the first condition being that the UE's relative speed to the Fxd-TRP is below another pre-configured threshold, i.e., the UE may be a StrSide-UE. Then, similarly, if the first condition and one or more of the other conditions are met by the UE, the UE may be configured to take measurements on the Fxd-TRP's frequency and, if appropriate, reselect to the Fxd-TRP.

V. Example Embodiments

Handover Procedure from Fxd-TRP to Mbl-TRP

Figure 6:
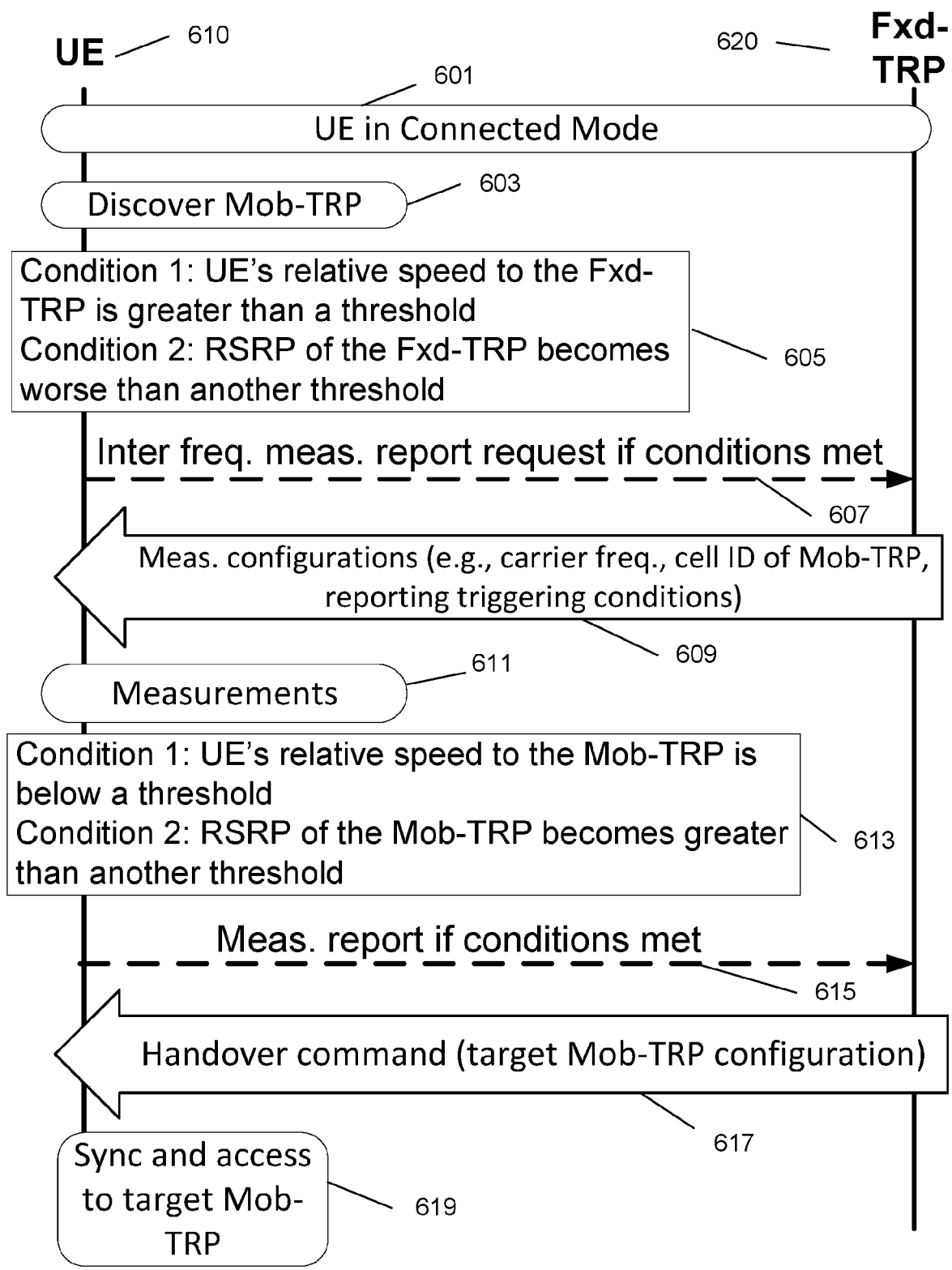
FIG. 6 is a signal flow diagram illustrating a process for UE handover from a Fxd-TRP to a Mbl-TRP in accordance with an exemplary embodiment.

FIG. 6 is a signal flow diagram illustrating an exemplary process based on one or more of the above embodiments for enabling the handing over of a UE from a Fxd-TRP to a Mbl-TRP operating in out-of-band mode. The exemplary process starts out with a UE 610 that is in connected mode (601) and attached to a Fxd-TRP 620. At 603, the UE detects the presence of the Mbl-TRP based on the discovery beacon signal as previously described (such as in Section II). Next, at 605, the UE 610 determines whether conditions are appropriate for sending an inter-frequency measurement request (such as described in Section III). Assuming the conditions are appropriate, at 607, the UE 610 sends an inter-frequency measurement request. At 609, the Fxd-TRP 620 sends a measurement configuration message back to the UE 610. The UE then takes the inter-frequency measurements, as shown at 611. Next, at 613, the UE determines if conditions are appropriate for sending a measurement report (such as described in Section III) and, assuming so, sends the inter-frequency measurements, to the Fxd-TRP, as shown at 615. At 617, the Fxd-TRP 620 sends a handover command to the UE. Finally, at 619, the UE 610 synchronizes to and accesses the target Mbl-TRP. The process of maintaining the connection to the Mbl-TRP includes monitoring the Maint-RS.

The procedure illustrated in FIG. 6 is largely applicable to both in-band Mbl-TRP and out-of-band Mbl-TRP operational scenarios. The difference between the two scenarios may be that, for the out-of-band Mbl-TRP scenario, the UE may perform an additional step of requesting inter-frequency measurement when the triggering conditions are met.

VI. Conclusion

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed", "computer executed", or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1E, 2, and 3.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B". Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to", "at least", "greater than", "less than", and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

Although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WRTU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed", "computer executed", or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

No element, act, or instruction used in the description of the present application should be construed as critical or essential to the invention unless explicitly described as such. In addition, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. § 112, ¶ 6, and any claim without the word "means" is not so intended.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WRTU), user equipment (UE), terminal, base station, Mobility Management Entity (MME) or Evolved Packet Core (EPC), or any host computer. The WRTU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method implemented in a wireless transmit receive unit (WTRU), the method comprising:
    receiving a discovery reference signal (Disc-RS) from a mobile transmission point (Mbl-TRP);
    responsive to the Disc-RS and determinations that:
        a) a first estimated speed of the WTRU relative to a fixed transmission point (Fxd-TRP) with which the WTRU is associated is greater than a first threshold; and
        b) a first signal measurement of a first signal received from the Fxd-TRP is less than a second threshold, determining (i) a second estimated speed of the WTRU relative to the Mbl-TRP and (ii) a second signal measurement of the Disc-RS; and
    transmitting a measurement report to a network responsive to determinations that:
        c) the second estimated speed is less than a third threshold; and
        d) the second signal measurement is greater than a fourth threshold.

2. The method of claim 1, further comprising:
    receiving a handover command from the Fxd-TRP; and
    synchronizing to the Mbl-TRP.

3. The method of claim 2, wherein synchronizing to the Mbl-TRP comprises: synchronizing to the Mbl-TRP using the Disc-RS or a maintenance reference signal (Maint-RS) received from the Mbl-TRP.

4. The method of claim 2, further comprising:
receiving from the Mbl-TRP a maintenance reference signal (Maint-RS), wherein the Maint-RS has signal characteristics different from the signal characteristics of the Disc-RS; and
using the Maint-RS to maintain connection with the Mbl-TRP.

5. The method of claim 1, further comprising:
determining that the Disc-RS is from the Mbl-TRP based on signal characteristics of the Disc-RS, wherein the signal characteristics comprise at least one of:
a timing offset between the Disc-RS and a frame timing at which Disc-RSs are received;
a periodicity of the Disc-RS;
a set of physical resource blocks (PRBs) over which the Disc-RS is received;
a frequency over which the Disc-RS is received;
a beam parameter of the Disc-RS;
a synchronization signal block (SS block) used to transmit the Disc-RS;
a signal sequence type of the Disc-RS; and
a sequence parameter of the Disc-RS.

6. The method of claim 1, wherein the measurement report comprises information indicating the second signal measurement.

7. The method of claim 1, wherein the second signal measurement comprises at least one of a signal strength of the Mbl-TRP and a signal quality of the Mbl-TRP, including any of:
a reference signal received power (RSRP) of the Mbl-TRP; and
a plurality of RSRP measurements of the Mbl-TRP.

8. The method of claim 1, determining the second estimated speed comprises at least one of:
estimating a channel coherence time using signal characteristics of the Disc-RS;
determining a level of consistency between multiple RSRP measurements of the Mbl-TRP; and
using information obtained from a vehicle-to-vehicle message or a vehicle-to-infrastructure message received by the WTRU, wherein the information indicates at least one of an identification of a vehicle with which the Mbl-TRP is associated, a speed of the vehicle, a direction of the vehicle, and location of the vehicle.

9. The method of claim 1, wherein receiving the Disc-RS comprises:
detecting a discovery beacon on a first carrier, wherein the first carrier is the same carrier on which the WTRU received the first signal;
transmitting, toward the Fxd-TRP, a request for a measurement gap;
receiving, from the Fxd-TRP, information indicating the measurement gap; and
monitoring for the Disc-RS on a second carrier during the measurement gap.

10. The method of claim 1, wherein determining the first estimated speed comprises at least one of:
estimating a speed of the WTRU relative to a fixed reference point using a global positioning system; and
estimating channel correlation with respect to reference signals received from the Fxd-TRP at two time instances.

11. A wireless transmit receive unit (WTRU) comprising circuitry, including a transmitter, receiver and a processor, configured to:
receive a discovery reference signal (Disc-RS) from a mobile transmission point (Mbl-TRP);
responsive to the Disc-RS and determinations that:
a) a first estimated speed of the WTRU relative to a fixed transmission point (Fxd-TRP) with which the WTRU is associated is greater than a first threshold; and
b) a first signal measurement of a first signal received from the Fxd-TRP is less than a second threshold,
determine (i) a second estimated speed of the WTRU relative to the Mbl-TRP and (ii) a second signal measurement of the Disc-RS; and
transmit a measurement report responsive to determinations that:
c) the second estimated speed is less than a third threshold; and
d) the second signal measurement is above a fourth threshold.

12. The WTRU of claim 11, wherein the circuitry is further configured to:
receive a handover command from the Fxd-TRP; and
synchronize to the Mbl-TRP.

13. The WTRU of claim 12, wherein the circuitry is further configured to:
receive from the Mbl-TRP a maintenance reference signal (Maint-RS), wherein the Maint-RS has signal characteristics different from the signal characteristics of the Disc-RS; and
use the Maint-RS to maintain connection with the Mbl-TRP.

14. The WTRU of claim 12, wherein the circuitry being configured to synchronize to the Mbl-TRP comprises the circuitry being configured to synchronize to the Mbl-TRP using the Disc-RS or a maintenance reference signal (Maint-RS) received from the Mbl-TRP.

15. The WTRU of claim 11, wherein the circuitry is further configured to:
determine that the Disc-RS is from the Mbl-TRP based on signal characteristics of the Disc-RS, wherein the signal characteristics comprise at least one of:
a timing offset between the Disc-RS and a frame timing at which Disc-RSs are received;
a periodicity of the Disc-RS;
a set of physical resource blocks (PRBs) over which the Disc-RS is received;
a frequency over which the Disc-RS is received;
a beam parameter of the Disc-RS;
a synchronization signal block (SS block) used to transmit the Disc-RS;
a signal sequence type of the Disc-RS; and
a sequence parameter of the Disc-RS.

16. The WTRU of claim 11, wherein the measurement report comprises information indicating the second signal measurement.

17. The WTRU of claim 11, wherein the second signal measurement comprises at least one of a signal strength of the Mbl-TRP and a signal quality of the Mbl-TRP, including any of:
a reference signal received power (RSRP) of the Mbl-TRP; and
a plurality of RSRP measurements of the Mbl-TRP.

18. The WTRU of claim 11, wherein the circuitry is configured to determine the second estimated speed based on at least one of:

a channel coherence time estimated using signal characteristics of the Disc-RS;

a determined level of consistency between multiple RSRP measurements of the Mbl-TRP; and information obtained from a vehicle-to-vehicle message or a vehicle-to-infrastructure message received by the WTRU, wherein the information indicates at least one of an identification of a vehicle with which the Mbl-TRP is associated, a speed of the vehicle, a direction of the vehicle, and location of the vehicle.

19. The WTRU of claim 11, wherein the circuitry being configured to receive the Disc-RS comprises the circuitry being configured to:

detect a discovery beacon on a first carrier, wherein the first carrier is the same carrier on which the WTRU received the first signal;

transmit, toward the Fxd-TRP, a request for a measurement gap;

receive, from the Fxd-TRP, information indicating the measurement gap; and monitor for the Disc-RS on a second carrier during the measurement gap.

20. The WTRU of claim 11, wherein the circuitry is configured to determine the first estimated speed based on at least one of:

an estimated speed of the WTRU relative to a fixed reference point using a global positioning system; and a channel correlation estimated with respect to reference signals received from the Fxd-TRP at two time instances.

* * * * *

UNITED STATES PATENT AND TRADEMARK OFFICE
CERTIFICATE OF CORRECTION

PATENT NO. : 11,102,711 B2  
APPLICATION NO. : 16/491416  
DATED : August 24, 2021  
INVENTOR(S) : Yang et al.

Page 1 of 1

It is certified that error appears in the above-identified patent and that said Letters Patent is hereby corrected as shown below:

In the Claims

In Column 33, Line 37, Claim 8, immediately after the "," insert --wherein--

Signed and Sealed this  
Twenty-fourth Day of June, 2025

Coke Morgan Stewart  
*Acting Director of the United States Patent and Trademark Office*